US012742870B2

(12) United States Patent
Kong et al.

(10) Patent No.: US 12,742,870 B2
(45) Date of Patent: Sep. 22, 2026

(54) METHOD FOR FILTERING POINT CLOUD OF FOUR-DIMENSIONAL RADAR AND DATA PROCESSING DEVICE

(71) Applicant: KOREA ADVANCED INSTITUTE OF SCIENCE AND TECHNOLOGY, Daejeon (KR)

(72) Inventors: Seung Hyun Kong, Daejeon (KR); Dong Hee Paek, Daejeon (KR); Seung Tae Han, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 260 days.

(21) Appl. No.: 18/574,547

(22) PCT Filed: Oct. 26, 2021

(86) PCT No.: PCT/KR2021/015115
§ 371 (c)(1),
(2) Date: Dec. 27, 2023

(87) PCT Pub. No.: WO2023/282394
PCT Pub. Date: Jan. 12, 2023

(65) Prior Publication Data

US 2025/0130325 A1 Apr. 24, 2025

(30) Foreign Application Priority Data

Jul. 8, 2021 (KR) ........................ 10-2021-0089890

(51) Int. Cl.
*G01S 13/524* (2006.01)

(52) U.S. Cl.
CPC ................................ *G01S 13/5246* (2013.01)

(58) Field of Classification Search
None
See application file for complete search history.

(56) References Cited

U.S. PATENT DOCUMENTS

2016/0245911 A1 8/2016 Wang et al.
2019/0107615 A1 4/2019 Eljarat et al.
(Continued)

FOREIGN PATENT DOCUMENTS

EP 2690458 A1 1/2014
JP 2012-220267 A 11/2012
(Continued)

OTHER PUBLICATIONS

International Search Report for PCT/KR2021/015115 mailed Nov. 2, 2022 from Korean Intellectual Property Office.
(Continued)

*Primary Examiner* — Whitney Moore
(74) *Attorney, Agent, or Firm* — Paratus Law Group, PLLC

(57) ABSTRACT

A method for filtering a point cloud of a four-dimensional radar including the steps in which a data processing device receives an input of raw data of a four-dimensional radar, generates a tensor including position and Doppler information from the raw data, extracts a radar point cloud from the tensor on the basis of a threshold, and removes an outlier from the radar point cloud. A range is calculated further using Doppler information of points.

4 Claims, 6 Drawing Sheets

(56) References Cited

U.S. PATENT DOCUMENTS

2020/0218908 A1* 7/2020 Lee ........................ G06V 10/82
2020/0379096 A1 12/2020 Zhou et al.

FOREIGN PATENT DOCUMENTS

KR 10-2015-0051854 A 5/2015
KR 10-1630264 B1 6/2016
KR 10-2021-0080634 A 6/2021

OTHER PUBLICATIONS

Korean Office Action for related KR Application No. 10-2021-0089890 mailed Sep. 11, 2023 from Korean Intellectual Property Office.

* cited by examiner (A)

(B)

200
radar point cloud
210
set ROI
ROI point cloud
220
set reference point
reference point
(x1, y1, doppler1)
230
set neighboring point
neighboring point
(x2, y2, doppler2)
240
calculate range
range
250
determine outlier
outlier
260
remove outlier
final radar point cloud vehicle
pedestrian
: outlier
vehicle
pedestrian
: point not identified as outlier
: point identified as outlier
(A)
vehicle
pedestrian
: outlier
vehicle
pedestrian
: point not identified as outlier
: point identified as outlier
(B)

FIG. 6

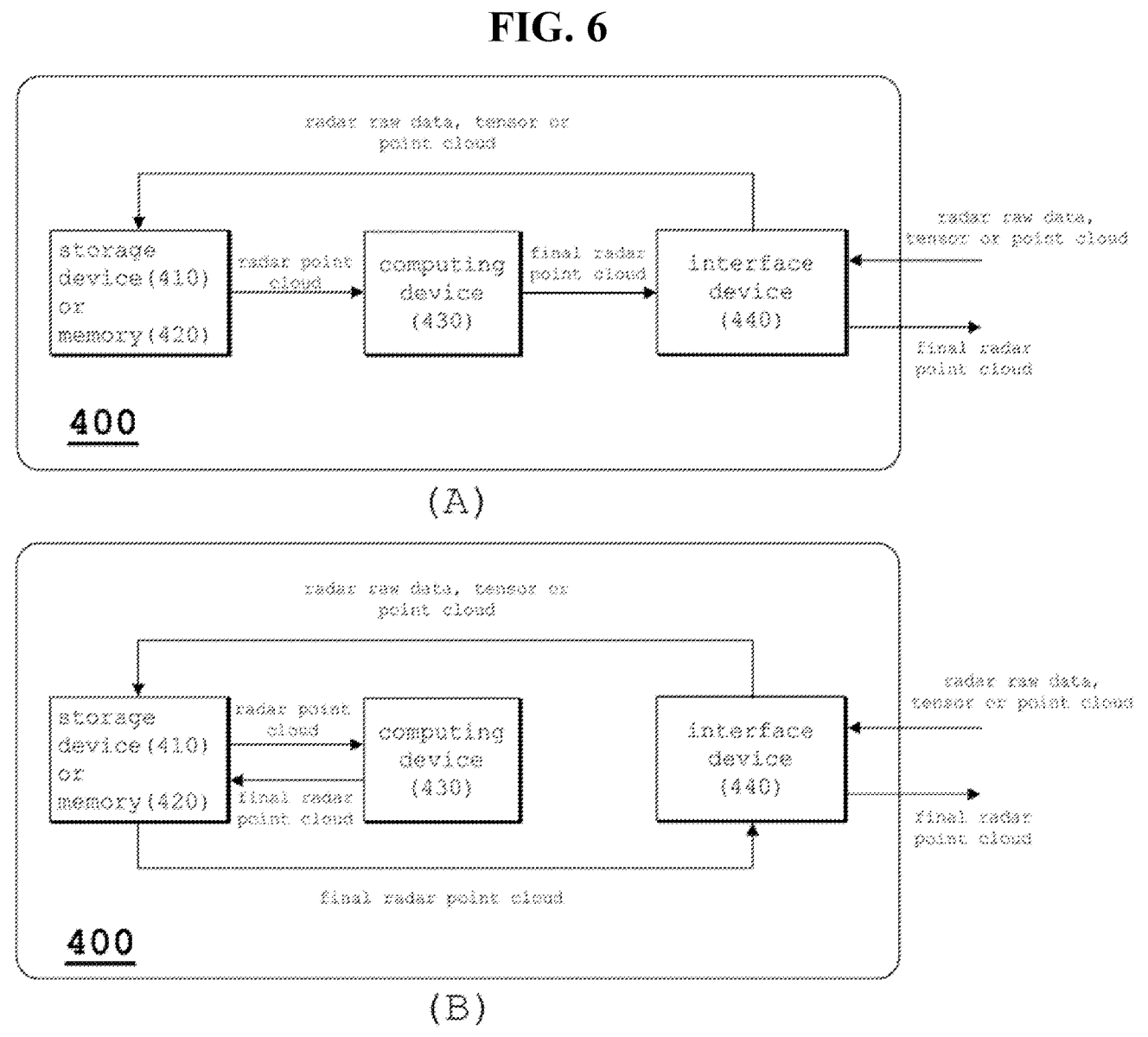

400 storage device(410) or memory(420)

computing device (430)

interface device (440)

radar point cloud final radar point cloud radar raw data, tensor or point cloud radar raw data, tensor or point cloud final radar point cloud (A)

400 storage device(410) or memory(420)

computing device (430)

interface device (440)

radar point cloud final radar point cloud radar raw data, tensor or point cloud final radar point cloud radar raw data, tensor or point cloud final radar point cloud (B)

METHOD FOR FILTERING POINT CLOUD OF FOUR-DIMENSIONAL RADAR AND DATA PROCESSING DEVICE

CROSS-REFERENCE TO PRIOR APPLICATIONS

This Application is a National Stage Patent Application of PCT International Application No. PCT/KR2021/015115 (filed on Oct. 26, 2021), which claims priority to Korean Patent Application No. 10-2021-0089890 (filed on Jul. 8, 2021), which are all hereby incorporated by reference in their entirety.

BACKGROUND

The present disclosure relates to a technology for removing outliers from a point cloud of a four-dimensional radar.

In automotive systems, radar is a key component in driver assistance systems and autonomous driving along with cameras and lidar.

Radar uses relatively longer wavelength signals compared to laser-based range-finding sensors such as lidar, and thus the radar operates robustly in a variety of lighting conditions and adverse weather conditions. However, radar receives noise and clutter signals caused by numerous additional factors such as signal interference and multiple reflection paths, and may generate information containing outliers in addition to the information of an actual object being measured.

SUMMARY

A four-dimensional radar is a sensor that measures range, Doppler, azimuth, and elevation. A point cloud, which is an output of a four-dimensional radar, may also contain outliers. The technology described below seeks to remove outliers in a point cloud by additionally using Doppler information output by a four-dimensional radar.

A method for filtering a point cloud of a four-dimensional (4D) radar includes: receiving, by a data processing device, raw data from a 4D radar; generating, by the data processing device, a tensor containing position and Doppler information from the raw data; extracting, by the data processing device, a radar point cloud from the tensor on the basis of a threshold; and removing, by the data processing device, an outlier from the radar point cloud. The radar point cloud may consist of a plurality of points, and the data processing device may remove the outlier on the basis of a range calculated further using Doppler information for each of at least some of the plurality of points.

A data processing device for filtering a point cloud of a four-dimensional (4D) radar includes: an interface device configured to receive any one of raw data, a tensor, or a radar point cloud of a 4D radar; a storage device configured to store a program that filters an outlier; and a computing device configured to remove an outlier from the radar point cloud using the program.

The computing device may generate, when the interface device receives the raw data, a tensor containing position and Doppler information from the raw data, and extract a radar point cloud based on a threshold generated using a threshold setting function on the generated tensor or a tensor received by the interface device.

The extracted radar point cloud or a radar point cloud received by the interface device may consist of a plurality of points, and the computing device may remove the outlier on the basis of a range calculated further using Doppler information for each of at least some of the plurality of points.

The technology described below can improve the outlier removal performance in a point cloud by using not only three-dimensional position information but also Doppler information output by a four-dimensional radar.

BRIEF DESCRIPTION OF THE DRAWINGS

FIG. 6 is an example of the operation of a data processing device.

DETAILED DESCRIPTION

Figure 1:
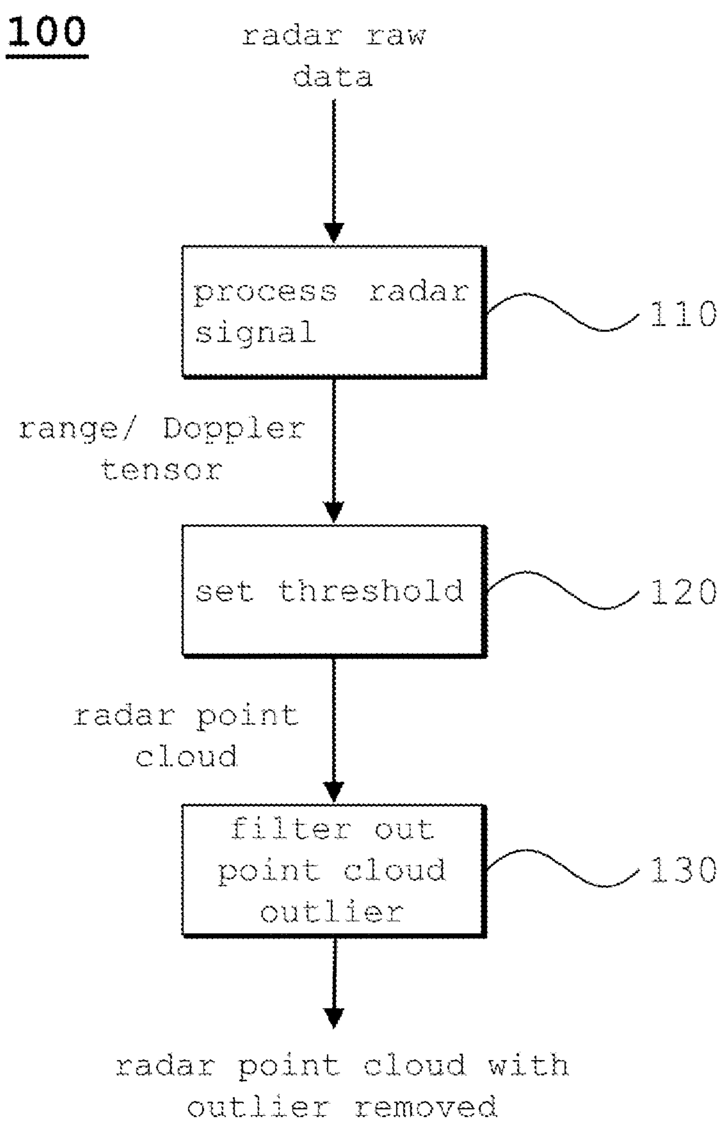
FIG. 1 is an example of the outlier removal process of a 4D point cloud.

The technology described below may be subject to various changes and may have various embodiments, and specific embodiments will be illustrated in the drawings and described in detail. However, this is not intended to limit the technology described below to specific embodiments, and should be understood to include all changes, equivalents or substitutes included in the spirit and scope of the technology described below.

Terms such as first, second, A, B, etc. may be used to describe various components, but the components are not limited by the terms, and are used only for the purpose of distinguishing one component from another. For example, the first component may be referred to as a second component without departing from the scope of the technology described below, and similarly, the second component may also be referred to as the first component. The term and/or includes any of a plurality of related stated items or a combination of a plurality of related stated items.

In terms used herein, singular expressions should be understood to include plural expressions unless the context clearly dictates otherwise. Terms such as “comprise” should be understood to mean the presence of the described features, numbers, steps, operations, components, parts, or combinations thereof, but not exclude the presence or addition of one or more other features, numbers, steps, operations, components, parts, or combinations thereof.

Before giving a detailed explanation of the drawings, it should be clear that the division of components in this specification is merely a classification according to the main function each component is responsible for. That is, two or more components, which will be described below, may be combined into one component, or one component may be divided into two or more components for more detailed functions. In addition to the main functions thereof, each component described below may additionally perform some or all of the functions performed by other components. Likewise, some of the main functions of each component may be performed by other components.

In performing a method or operating method, each process that constitutes the method may occur differently from the specified order unless a specific order is clearly stated in the context. That is, each process may occur in the same order specified, may be performed substantially simultaneously, or may be performed in the opposite order.

The technology described below is a technique for processing noise in signals received from radar that outputs not only position information of points but also Doppler information of the points. For convenience of explanation, the explanation is based on a four-dimensional (4D) radar.

Hereinafter, a point cloud, a radar point cloud, or a 4D point cloud all refer to a point cloud output by a 4D radar.

The following explains that a data processing device removes outliers from a radar point cloud. The data processing device refers to a configuration that removes outliers from signals received and produced by radar. The data processing device may be a component included in a radar device. Alternatively, the data processing device may be a separate device that processes signals output from a radar device.

The data processing device may be implemented as a chipset with an embedded program, a circuit composed of analog elements, etc. Considering a vehicle's radar, the data processing device may be an electronic control unit (ECU) that controls the radar.

FIG. 1 is an example of an outlier removal process 100 of a 4D point cloud. FIG. 1 shows the overall process by which a data processing device removes the outlier from a radar point cloud.

First, the data processing device receives radar raw data as input. The radar raw data refers to data initially generated by radar receiving a signal. That is, the radar raw data is data received when a signal output by the radar is reflected by an object.

The data processing device processes (110) the radar raw data to generate a tensor containing position and Doppler information. The tensor is defined as a vector space of 0 or more dimensions, and the output tensor may have three (range, azimuth, and Doppler) or more dimensions (range, azimuth, Doppler, and elevation, etc.)

excluding height information depending on the radar system configuration. In this process, the data processing device may perform Fourier transform and matched filter processing on the raw data.

The data processing device sets (120) a threshold for the input tensor using a predetermined threshold setting function. The threshold setting function may be one of various functions, such as fixed threshold or constant false alarm rate (CFAR). The data processing device may extract a radar point cloud by comparing a tensor value with the set threshold.

The data processing device may filter (130) an outlier from the extracted radar point cloud. The data processing device may calculate the range between points, including not only the point's position information but also Doppler information, and remove the outlier on the basis of the calculated range. The data processing device may use any one of various algorithms for removing (filtering) outliers.

For example, the data processing device may use a statistical outlier removal (SOR) filter, an algorithm that removes outliers based on statistical information. The SOR filter is a technique to determine irregularities through statistical analysis of each point and neighboring points thereof belonging to a radar point cloud. The SOR filter assumes that the average range between a specific reference point and neighboring points in the radar point cloud follows a Gaussian distribution, and determines a reference point that exceeds a predetermined threshold as an outlier. A reference point refers to a specific point that is subject to filtering (removal) determination.

Alternatively, the data processing device may use a radius outlier removal (ROR) filter that removes outliers on the basis of range. The ROR filter centers on a reference point belonging to the radar point cloud and removes the reference point when the number of neighboring points is less than a threshold on the basis of the number of points located within a predetermined radius.

The data processing device removes outliers from the radar point cloud and produces a radar point cloud with the outliers removed.

Figure 2:
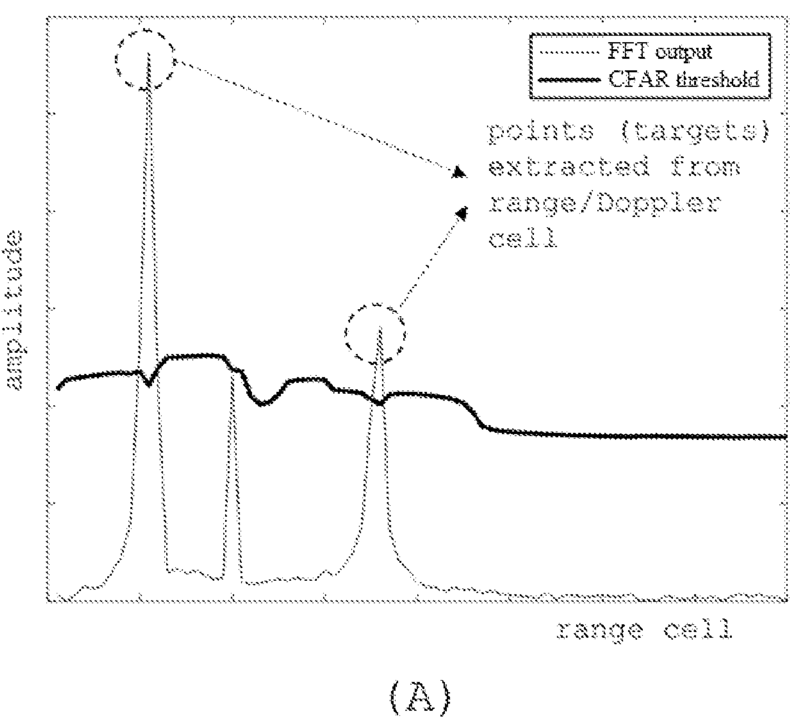
FIG. 2 is an example of a threshold setting function.
Figure 2:
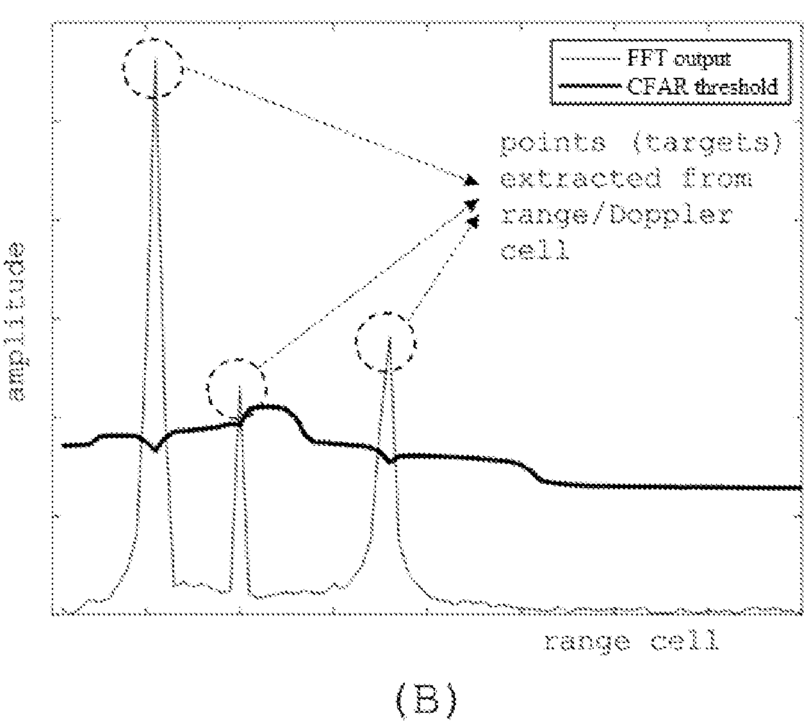

FIG. 2 is an example of a threshold setting function. FIG. 2 is an example of constant false alarm rate (CFAR) applied as a representative example of a threshold setting function. CFAR is an algorithm that produces a threshold in accordance with the average level of external interference noise to maintain a probability of false alarms constant. CFAR divides the frame into cells at regular intervals, designates a reference window consisting of reference cells in front of and behind the cell under test, and compares the average value of the reference cells in the window to find the location of a target without error.

FIG. 2 shows the process of finding a target by comparing the threshold determined by CFAR with the fast Fourier transform (FFT) output, which is a value obtained by processing radar data. FIG. 2, (A) and (B) show an example in which the detected target changes when the CFAR parameters are changed. For example, the data processing device may increase the window size so that the target detected varies. The CFAR parameters may be set differently depending on radar performance and type of application.

The data processing device may select targets detected by CFAR and extract a point cloud.

The process of removing outliers from a radar point cloud extracted by the data processing device will be explained.

Figure 3:
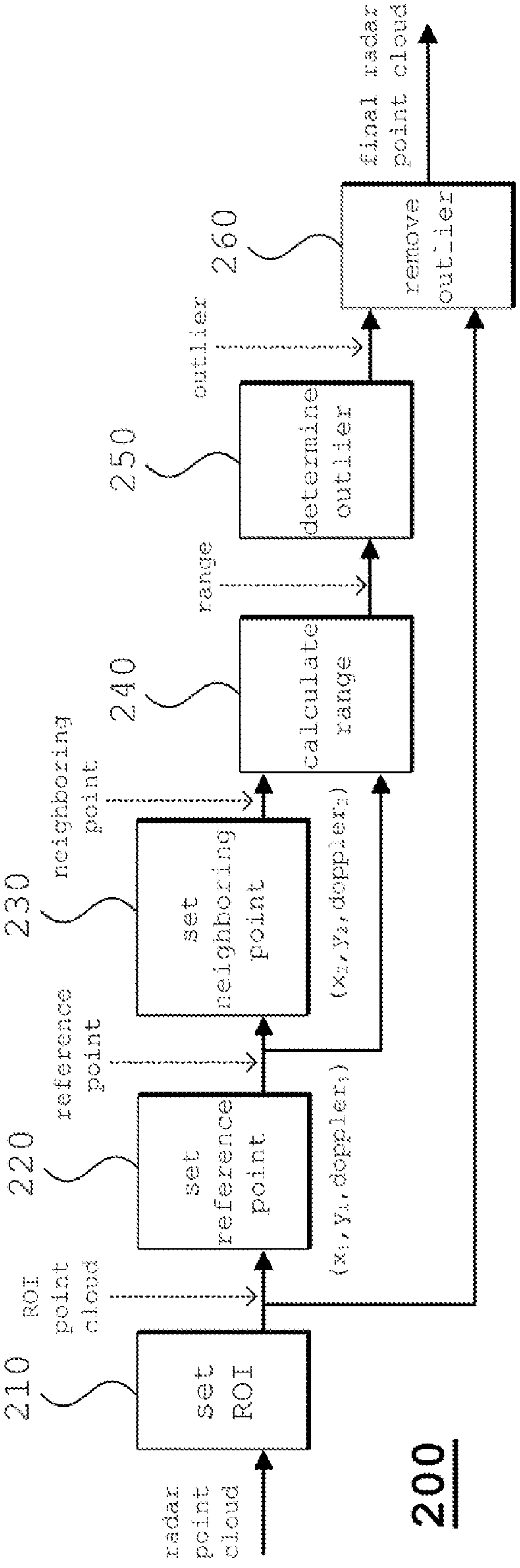
FIG. 3 is an example of the filtering process of a 4D point cloud filter.

FIG. 3 is an example of the filtering process 200 of a 4D point cloud filter. FIG. 3 shows a case where a point has position and Doppler information in a two-dimensional coordinate system.

The data processing device may set (210) a region of interest (ROI) in an initial radar point cloud. The data processing device may only need information about a specific area of the area detected by radar. In this case, the data processing device may select a point cloud belonging to a region of interest from the radar point cloud according to preset rules. The point cloud belonging to the region of interest is named an ROI point cloud. In other words, the ROI point cloud consists of some points from the entire radar point cloud.

The data processing device may remove outliers from points belonging to the ROI point cloud. Meanwhile, since the ROI setting process is an optional process, the data processing device may remove outliers from points belonging to the entire radar point cloud. For convenience of explanation, it is assumed that the data processing device sets an ROI and removes outliers.

The data processing device may repeatedly perform the same process for each point belonging to an ROI point cloud. One reference point is explained as an example. The data processing device sets (220) a specific reference point belonging to the ROI point cloud. The reference point may include two-dimensional position and Doppler information. For example, the reference point may be defined as ($x_1$, $y_1$, $doppler_1$). ($x_1$, $y_1$) is the two-dimensional position information of the reference point, and doppler is the Doppler information of the reference point. The Doppler information relates to a specific object around a vehicle and has specific values that change as the object moves or the vehicle moves. For example, the Doppler information has a positive or negative value depending on the direction based on a specific direction, and has a certain amount (level) value depending on the speed.

The data processing device sets (230) specific neighboring points around the reference point. The data processing device may set points at a certain distance from the reference point or n random points closest to the reference point as neighboring points. The neighboring points may be one or more points. FIG. 3 shows one neighboring point ($x_2$, $y_2$, $doppler_2$) from which the distance to the reference point is calculated.

The data processing device calculates (240) the range between the reference point and the neighboring point. In this case, the range is calculated including the points' position information, as well as Doppler information. The range between the points with two-dimensional position and Doppler information may be defined as the formulas below. Each of Equations 1 to 3 below is an example of a formula for calculating a range R.

$$R = |x_1 - x_2| + |y_1 - y_2| + \lambda|\text{doppler}_1 - \text{doppler}_2| \quad \text{[Equation 1]}$$

$$R = \sqrt{|x_1 - x_2| + |y_1 - y_2| + \lambda|\text{doppler}_1 - \text{doppler}_2|} \quad \text{[Equation 2]}$$

$$R = \sqrt{(x_1 - x_2)^2 + (y_1 - y_2)^2 + \lambda(\text{doppler}_1 - \text{doppler}_2)^2} \quad \text{[Equation 3]}$$

In the above formulas, the weight λ multiplied by the Doppler information may be determined according to the performance (specification) of radar. Of course, the formula for calculating range may be transformed into various forms.

The data processing device determines (250) whether the reference point is an outlier on the basis of the range between the reference point and the neighboring point. When the reference point is an outlier, the data processing device removes (260) the reference point (outlier).

The data processing device may set each point in the ROI point cloud as a reference point and repeat the process of determining whether or not the corresponding point is an outlier. By performing this process, the data processing device may finally calculate a final radar point cloud with outliers removed.

Figure 4:
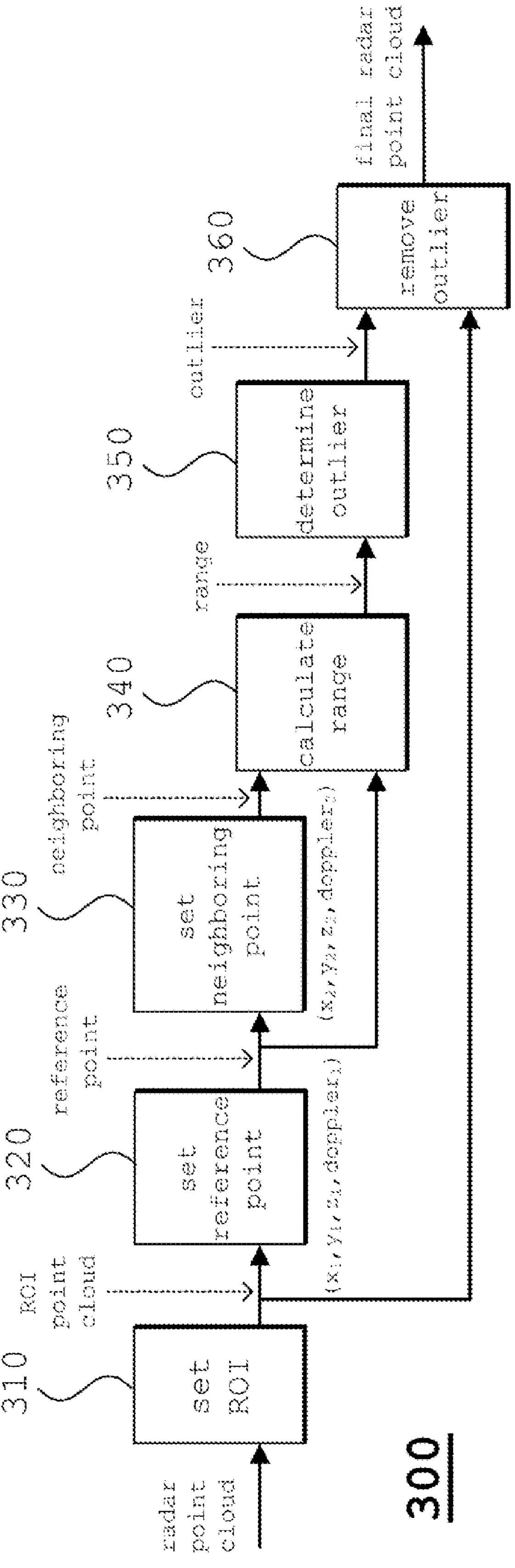
FIG. 4 is another example of the filtering process of a 4D point cloud filter.

FIG. 4 is another example of the filtering process 300 of a 4D point cloud filter. FIG. 4 shows a case where a point has position and Doppler information in a three-dimensional coordinate system.

The data processing device The data processing device may set (310) a region of interest (ROI) in an initial radar point cloud. The data processing device may only need information about a specific area of the area detected by radar. In this case, the data processing device may select a point cloud belonging to a region of interest from the radar point cloud according to preset rules.

The data processing device may remove outliers from points belonging to the ROI point cloud. Meanwhile, since the ROI setting process is an optional process, the data processing device may remove outliers from points belonging to the entire radar point cloud. For convenience of explanation, it is assumed that the data processing device sets an ROI and removes outliers.

The data processing device may repeatedly perform the same process for each point belonging to an ROI point cloud. One reference point is explained as an example. The data processing device sets (320) a specific reference point belonging to the ROI point cloud. The reference point may include three-dimensional position and Doppler information. For example, the reference point may be defined as ($x_1$, $y_1$, $z_1$, $doppler_1$). ($x_1$, $y_1$, $z_1$) is the three-dimensional position information of the reference point, and $doppler_1$ is the Doppler information of the reference point. The Doppler information relates to a specific object around a vehicle and has specific values that change as the object moves or the vehicle moves. For example, the Doppler information has a positive or negative value depending on the direction based on a specific direction, and has a certain amount (level) value depending on the speed.

The data processing device sets (330) specific neighboring points around the reference point. The data processing device may set points at a certain distance from the reference point or n random points closest to the reference point as neighboring points. The neighboring points may be one or more points. FIG. 3 shows one neighboring point ($x_2$, $y_2$, $z_2$, $doppler_2$) from which the distance to the reference point is calculated.

The data processing device calculates (340) the range between the reference point and the neighboring point. In this case, the range is calculated including the points' position information, as well as Doppler information. The range between the points with two-dimensional position and Doppler information may be defined as the formulas below. Each of Equations 4 to 6 below is an example of a formula for calculating a range R.

$$R = |x_1 - x_2| + |y_1 - y_2| + |z_1 - z_2| + \lambda|\text{doppler}_1 - \text{doppler}_2| \quad \text{[Equation 4]}$$

$$R = \sqrt{|x_1 - x_2| + |y_1 - y_2| + |z_1 - z_2| + \lambda|\text{doppler}_1 - \text{doppler}_2|} \quad \text{[Equation 5]}$$

$$R = \sqrt{(x_1 - x_2)^2 + (y_1 - y_2)^2 + (z_1 - z_2)^2 + \lambda(\text{doppler}_1 - \text{doppler}_2)^2} \quad \text{[Equation 6]}$$

In the above formula, the weight λ multiplied by the Doppler information may be determined according to the performance (specification) of radar. Of course, the formula for calculating range may be transformed into various forms The data processing device determines (350) whether the reference point is an outlier on the basis of the range between the reference point and the neighboring point. When the reference point is an outlier, the data processing device removes (360) the reference point (outlier).

The data processing device may set each point in the ROI point cloud as a reference point and repeat the process of determining whether or not the corresponding point is an outlier. By performing this process, the data processing device may finally calculate a final radar point cloud with outliers removed.

Figure 5:
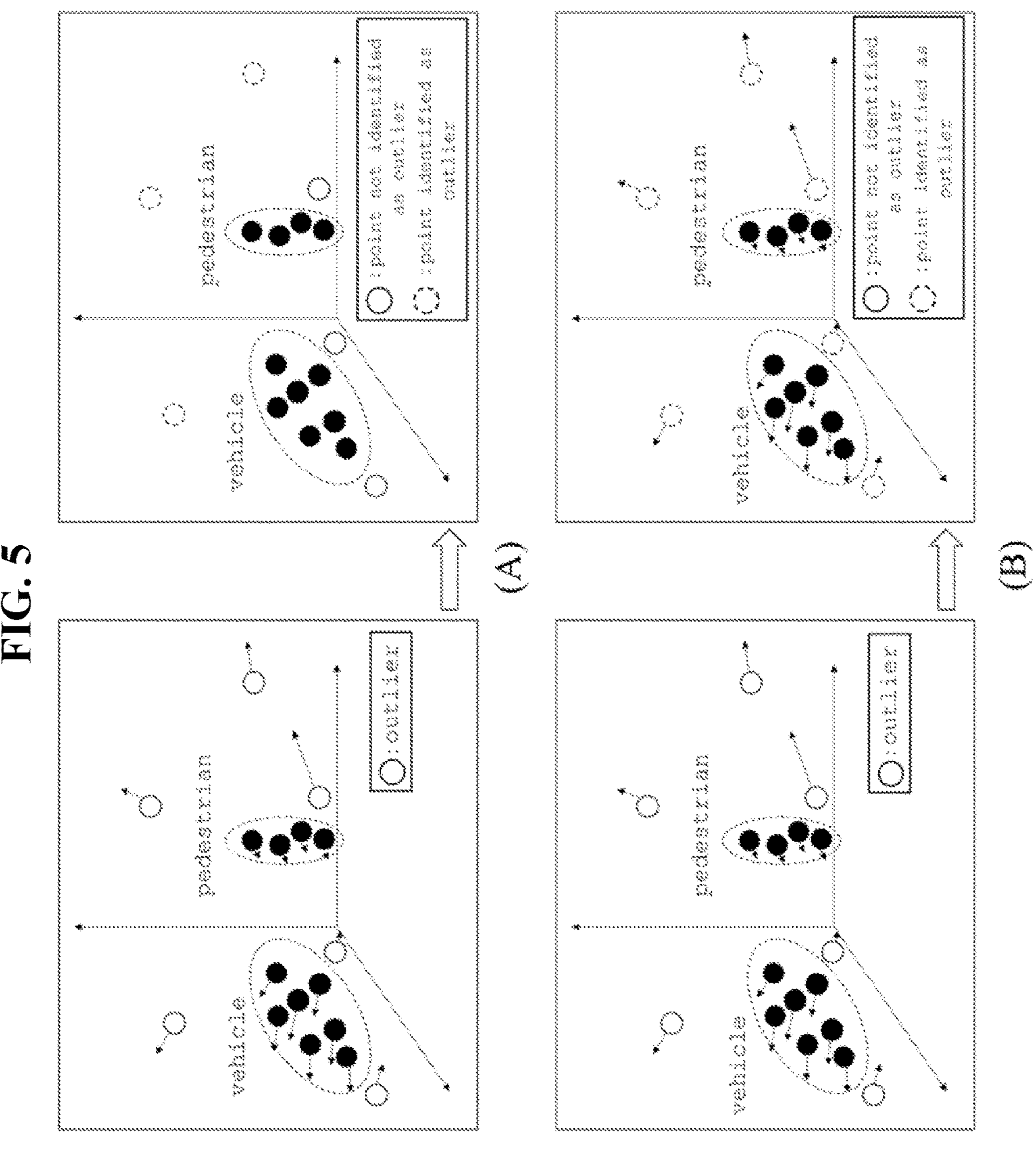
FIG. 5 is an example of 4D point cloud filtering results.

FIG. 5 is an example of 4D point cloud filtering results. FIG. 5 is not an experimental result, but logically shows an example in which points with different Doppler information are removed in the presence of a moving object.

FIG. 5, (A) shows the result of removing outliers from a radar point cloud using only point position information. FIG. 5, (B) shows the result of removing outliers from a radar point cloud using point position and Doppler information.

The left picture of FIG. 5, (A) is the radar point cloud before outliers are removed, and the right picture of FIG. 5, (A) is the radar point cloud after outliers are removed. In FIG. 5, (A), arrows indicate Doppler information. FIG. 5, (A) shows points that are outliers but are not removed because the points do not reflect the Doppler effect in the radar point cloud.

FIG. 5, (B) is an example of removing outliers from the same radar point cloud as FIG. 5, (A). The left picture of FIG. 5, (B) is the radar point cloud before outliers are removed, and the right picture of FIG. 5, (B) is the radar point cloud after outliers are removed. In FIG. 5, (B), arrows indicate Doppler information. FIG. 5, (B) is an example of removing outliers from the same radar point cloud as FIG. 5, (A). Looking at FIG. 5, (B), it can be seen that, unlike FIG. 5, (A), outliers are more accurately removed by reflecting Doppler information.

FIG. 6 is an example of the operation of a data processing device 400.

FIG. 6 shows the physical configuration of the data processing device 400 for removing outliers from a radar point cloud. The data processing device 400 may be a component built into a 4D radar or a separate device in a vehicle.

The data processing device may include a storage device 410, a memory 420, a computing device 430, and an interface device 440.

The storage device 410 may store a program for processing radar data and a program for removing outliers from a radar point cloud.

The storage device 410 may store input raw radar data.

The storage device 410 may store a final radar point cloud from which outliers have been removed.

The memory 420 may store data and information generated by the data processing device during a signal processing process.

The interface device 440 is a device that exchanges data with physically connected surrounding objects. The interface device 440 may receive raw radar data received from a radar device. In addition, the interface device 440 may transmit the radar point cloud from which outliers have been removed to another device.

The computing device 430 may consistently process radar raw data. For example, the computing device 430 may perform Fourier transform and signal matching on raw data.

The computing device 430 may generate a tensor containing range and Doppler information from raw data.

The computing device 430 may set a certain threshold using a program that determines a threshold value. The computing device 430 may extract a radar point cloud by selecting targets that exceed the threshold among tensors.

The computing device 430 may extract the final radar point cloud from which outliers have been removed using a program that removes outliers from an initial radar point cloud or an ROI point cloud.

The computing device 430 may calculate the range between a reference point and neighboring points for points belonging to an initial radar point cloud or an ROI point cloud. Range calculation is as described above. As described above, the computing device 430 may remove outliers by applying a filtering algorithm (SOR filter, ROR filter, etc.) to a reference point.

The computing device 430 may be a device such as a processor that processes data and performs predetermined operations, an AP, or a chip with an embedded program.

FIG. 6, (A) will be described.

The interface device 440 may receive any one of radar raw data, a tensor, or a point cloud from an external device. The external device may be a radar device or a device that consistently preprocesses radar raw data. The preprocessing device may be a device included in a radar or a separate device. The preprocessing device may extract tensors from radar raw data. Alternatively, the preprocessing device may extract an initial point cloud by applying the above-described threshold setting function to a tensor.

The storage device 410 or the memory 420 may receive any one of radar raw data, a tensor, or a point cloud from the interface device 440.

(1) When the interface device 440 receives raw radar data, the computing device 430 extracts a tensor from the raw radar data. The storage device 410 or the memory 420 may store the extracted tensor. Thereafter, the computing device 430 may extract a radar point cloud from the tensor on the basis of a threshold set using the above-described threshold setting function. The computing device 430 performs outlier filtering on the radar point cloud. The computing device 430 may filter outliers for the entire radar point cloud, or may filter outliers for a certain ROI radar point cloud.

(2) When the interface device 440 receives a tensor, the computing device 430 may extract a radar point cloud from the tensor on the basis of a threshold set using the above-described threshold setting function. The storage device 410 or the memory 420 may store the extracted radar point cloud. The computing device 430 performs outlier filtering on the radar point cloud. The computing device 430 may filter outliers for the entire radar point cloud, or may filter outliers for a certain ROI radar point cloud.

(3) When the interface device 440 receives a radar point cloud, the computing device 430 performs outlier filtering on the radar point cloud. The computing device 430 may filter outliers for the entire radar point cloud, or may filter outliers for a certain ROI radar point cloud.

The computing device 430 may transmit a final radar point cloud from which outliers have been filtered to another device through the interface device 440.

FIG. 6, (B) will be described.

The interface device 440 may receive any one of radar raw data, a tensor, or a point cloud from an external device. The external device may be a radar device or a device that consistently preprocesses radar raw data. The preprocessing device may be a device included in a radar or a separate device. The preprocessing device may extract tensors from radar raw data. Alternatively, the preprocessing device may extract an initial point cloud by applying the above-described threshold setting function to a tensor.

The storage device 410 or the memory 420 may receive any one of radar raw data, a tensor, or a point cloud from the interface device 440.

(1) When the interface device 440 receives raw radar data, the computing device 430 extracts a tensor from the raw radar data. The storage device 410 or the memory 420 may store the extracted tensor. Thereafter, the computing device 430 may extract a radar point cloud from the tensor on the basis of a threshold set using the above-described threshold setting function. The computing device 430 performs outlier filtering on the radar point cloud. The computing device 430 may filter outliers for the entire radar point cloud, or may filter outliers for a certain ROI radar point cloud.

(2) When the interface device 440 receives a tensor, the computing device 430 may extract a radar point cloud from the tensor on the basis of a threshold set using the above-described threshold setting function. The storage device 410 or the memory 420 may store the extracted radar point cloud. The computing device 430 performs outlier filtering on the radar point cloud. The computing device 430 may filter outliers for the entire radar point cloud, or may filter outliers for a certain ROI radar point cloud.

(3) When the interface device 440 receives a radar point cloud, the computing device 430 performs outlier filtering on the radar point cloud. The computing device 430 may filter outliers for the entire radar point cloud, or may filter outliers for a certain ROI radar point cloud.

The computing device 430 may transmit the final radar point cloud from which outliers have been filtered to the storage device 410 or memory 420. Thereafter, the interface device 440 may receive the final radar point cloud from the storage device 410 or the memory 420 and transmit the received final radar point cloud to another device.

In addition, the 4D point cloud outlier filtering method described above may be implemented as a program (or application) containing an executable algorithm that can be executed on a computer. The program may be stored and provided in a temporary or non-transitory computer readable medium.

The non-transitory computer readable medium refers to a medium that stores data semi-permanently and may be read by a device, rather than a medium that stores data for a short period of time, such as registers, caches, and memories. To be specific, the various applications or programs mentioned above may be provided and stored on a non-transitory computer readable medium such as a CD, a DVD, a hard disk, a Blu-ray disc, a USB, a memory card, a read-only memory (ROM), a programmable read-only memory (PROM), an erasable PROM (EPROM) or an electrically erasable PROM (EEPROM), or a flash memory.

The temporary computer readable medium refers to various RAMs such as a static RAM (SRAM), a dynamic RAM (DRAM), a synchronous DRAM (SDRAM), a double data rate SDRAM (DDR SDRAM), an enhanced SDRAM (ESDRAM), a SyncLink DRAM (SL DRAM), and a direct Rambus RAM (DRRAM).

The embodiments and the drawings attached to this specification merely clearly show some of the technical ideas included in the above-described technology, and it is obvious that all the modifications and specific embodiments that may be easily inferred by a person skilled in the art within the scope of the technical idea included in the technical specifications and drawings described above are included in the scope of rights of the above-described technology.

The invention claimed is:

1. A data processing device for filtering a point cloud of a four-dimensional (4D) radar, comprising:

an interface device configured to receive any one of raw data, a tensor, or a radar point cloud of a 4D radar;

a storage device configured to store a program that filters an outlier; and a computing device configured to remove an outlier from the radar point cloud using the program, wherein the computing device generates, when the interface device receives the raw data, a tensor containing position and Doppler information from the raw data, and extracts a radar point cloud based on a threshold generated using a threshold setting function on the generated tensor or a tensor received by the interface device, wherein the extracted radar point cloud or a radar point cloud received by the interface device consists of a plurality of points, wherein the computing device removes the outlier on the basis of a range calculated further using Doppler information for each of at least some of the plurality of points, wherein the range is calculated on the basis of position and Doppler information of each of first and second points among the some of the plurality of points, and the position is a position in a two-dimensional or three-dimensional coordinate system, and wherein the range is calculated on the basis of a difference between a Doppler measurement value of the first point and a Doppler measurement value of the second point multiplied by a weight.

2. The device of claim 1, wherein the threshold setting function determines the threshold on the basis of fixed threshold or constant false alarm rate (CFAR).

3. The device of claim 1, wherein the program removes the outlier using a statistical information-based filtering method or a distance information-based filtering method based on the range.

4. The device of claim 1, wherein the program sets a first point and a second point located around the first point among the some of the plurality of points, and determines whether the first point is an outlier on the basis of a range between the first point and the second point.

* * * * *